(12) United States Patent
Hegmann

(10) Patent No.: US 7,748,716 B2
(45) Date of Patent: Jul. 6, 2010

(54) FLAT GASKET, IN PARTICULAR, CYLINDER HEAD GASKET

(75) Inventor: Oliver Hegmann, Bischofsheim (DE)

(73) Assignee: ElringKlinger AG, Dettingen (DE)

( * ) Notice: Subject to any disclaimer, the term of this patent is extended or adjusted under 35 U.S.C. 154(b) by 0 days.

(21) Appl. No.: 11/511,648

(22) Filed: Aug. 29, 2006

(65) Prior Publication Data
US 2007/0210532 A1 Sep. 13, 2007

(30) Foreign Application Priority Data
Mar. 9, 2006 (DE) .................. 20 2006 003 678 U

(51) Int. Cl.
F16J 15/02 (2006.01)
F02F 11/00 (2006.01)
(52) U.S. Cl. .................. 277/591; 277/593; 277/595
(58) Field of Classification Search ................ 277/591, 277/593–595
See application file for complete search history.

(56) References Cited
U.S. PATENT DOCUMENTS
4,791,897 A * 12/1988 Udagawa .................. 123/193.3

| 5,255,927 | A | * | 10/1993 | Miyaoh | 277/595 |
| 5,427,389 | A | * | 6/1995 | Ishikawa et al. | 277/595 |
| 5,570,892 | A | * | 11/1996 | Udagawa | 277/595 |
| 5,626,350 | A | * | 5/1997 | Kubouchi et al. | 277/595 |
| 5,685,547 | A | * | 11/1997 | Jargeaix | 277/598 |
| 2006/0091615 | A1 | * | 5/2006 | Udagawa | 277/594 |
| 2006/0097460 | A1 | * | 5/2006 | Udagawa et al. | 277/595 |
| 2006/0163817 | A1 | * | 7/2006 | Ishikawa et al. | 277/494 |

* cited by examiner

Primary Examiner—Vishal Patel

(57) ABSTRACT

Flat gasket with a gasket plate comprising at least one sheet metal layer, at least one fluid through-opening to be sealed, and a plurality of screw through-openings, the sheet metal layer having at least one supporting element for receiving pressing forces, and the supporting element being in the form of a bead stamped into the sheet metal layer; in order to improve the durability of the supporting bead while in operation, the bead is designed so as to form with its bead crest, in a plan view of the sheet metal layer, an endless continuous line closed within itself, so that the bead does not have any free bead ends.

28 Claims, 6 Drawing Sheets sheet metal layer

FLAT GASKET, IN PARTICULAR, CYLINDER HEAD GASKET

The present disclosure relates to the subject matter disclosed in German utility model application number 20 2006 003 678.4 of Mar. 9, 2006, which is incorporated herein by reference in its entirety and for all purposes.

BACKGROUND OF THE INVENTION

The invention relates to an at least substantially metallic flat gasket with a gasket plate comprising at least one sheet metal layer, at least one fluid through-opening to be sealed (in the case of a cylinder head gasket, for example, for the passage of combustion gases or cooling water or lubricating oil), and a plurality of screw through-openings for the passage of screws therethrough for clamping the flat gasket between sealing surfaces of components (for example, the sealing surfaces of a cylinder head and an engine block), the sheet metal layer having at least one supporting element for receiving pressing forces acting on the flat gasket when the flat gasket is installed, and the supporting element comprising at least one bead stamped into the sheet metal layer and having a bead crest forming a continuous line.

The invention will be explained hereinbelow with reference to cylinder head gaskets, although a flat gasket according to the invention is also suitable for other applications, for example, for a gasket between a cylinder head and an exhaust manifold, or for a so-called flange gasket between flanges of two pipes or other components to be joined to one another by screws.

In single-layered and multi-layered metallic cylinder head gaskets, sealing around the combustion chamber through-openings of the gasket plate is usually effected by sealing beads stamped into one sheet metal layer or several sheet metal layers. These sealing beads enclose the combustion chamber through-openings and are mostly formed as so-called full beads with a circular arc-shaped or approximately U-shaped cross section. As these sealing beads must have elastic properties in the direction of their height, so as to also fulfill their sealing function during operation of the engine, a sheet metal layer provided with sealing beads is made of spring steel. In order to prevent the sealing beads from becoming excessively flattened when the cylinder head gasket is being installed and during operation of the engine and thereby becoming damaged (as a result of permanent breakages), the sealing beads have associated deformation delimiters (so-called stoppers), which are thickened zones of one or several sheet metal layers. When the cylinder head gasket is installed and the engine is in operation, these stoppers receive some of the pressing forces acting on the cylinder head gasket after the sealing beads have been flattened somewhat elastically owing to these pressing forces. Accordingly, these stoppers are not only deformation delimiters but also supporting elements which are associated with the sealing beads enclosing the combustion chamber through-openings. However, the present invention does not relate to such supporting elements as are associated with combustion chamber sealing beads and enclose combustion chamber through-openings.

Above all, in single-layered and multi-layered metallic cylinder head gaskets, thickened supporting elements are also used at other places than around cylinder head gasket openings to be sealed, and the present invention relates to such supporting elements. In a multi-cylinder engine, the usual position of the cylinder head screws results in the cylinder head being drawn in the area of its narrow sides, i.e., its longitudinal ends, with a stronger tendency downwards, i.e., in the direction towards the engine block, than in other areas of the cylinder head. Moreover, when the engine is in operation, the high gas pressures prevailing in the combustion chambers cause the cylinder head to arch up between its longitudinal ends (albeit slightly) during operation of the engine. These two effects have already been counteracted by providing the cylinder head gasket in the area of its longitudinal ends with thickened zones which serve as elevated supporting elements for the longitudinal ends of the cylinder head. However, since a multi-cylinder reciprocating piston engine is often more susceptible to deformation in the areas of its longitudinal sides, for example, on account of the inlet and outlet ports, than in other areas, elevated supporting elements have also already been provided at the longitudinal sides of the cylinder head gaskets.

U.S. Pat. No. 5,427,389-A discloses a multi-layered metallic cylinder head gasket of the kind mentioned at the outset, wherein a sheet metal layer lying inside the approximately rectangular gasket plate is provided in the end areas of this sheet metal layer in the vicinity of the two narrow sides of the gasket plate with supporting elements which are full beads stamped into this sheet metal layer. The following three different embodiments are disclosed for these supporting beads: in the first embodiment, each of the two aforementioned end areas of the sheet metal layer is provided with a straight-lined supporting bead extending in the proximity of the respective narrow side edge of this sheet metal layer and parallel thereto; in the second embodiment, the supporting bead has approximately the shape of a lying U and extends parallel to the adjacent narrow side edge and over a certain distance parallel to the two longitudinal side edges of the sheet metal layer; in the third embodiment, the supporting bead is, in a plan view of the sheet metal layer, of wave-like configuration and extends in the vicinity of the pertinent narrow side edge of the sheet metal layer approximately parallel to this narrow side edge. As has been ascertained by the firm of ElringKlinger AG, all of these supporting beads have the disadvantage that, when the engine is in operation, they exhibit wear phenomena, starting off from the free bead ends, which increase as the operating time increases, and the cause of which has not been able to be fully clarified. It is also to be assumed that the same or similar wear phenomena occur with other flat gaskets of the kind mentioned at the outset whenever the flat gasket is subjected to dynamic stresses, in particular, load variations, when in operation.

The object underlying the invention was to create a flat gasket of the kind mentioned at the outset, in which the at least one supporting element formed by at least one bead has a longer service life in operation, i.e., is subject either to no wear or to only a significantly lower degree of wear than the supporting beads disclosed by U.S. Pat. No. 5,427,389-A.

SUMMARY OF THE INVENTION

The inventors have, surprisingly, ascertained that the risk of wear can be at least significantly reduced by a simple measure, namely, in accordance with the invention, in that the bead serving to receive pressing forces (not to seal off a medium) is designed such that, in a plan view of the sheet metal layer, it forms with its bead crest an endless continuous line closed within itself, so that the bead does not have any free bead ends. Such a bead designed in accordance with the invention requires no greater manufacturing expenditure whatsoever than the manufacture of the supporting beads disclosed in U.S. Pat. No. 5,427,389-A.

In conjunction with the basic concept underlying the present invention it is pointed out that the supporting bead according to the invention does not enclose any through-opening of the flat gasket and, consequently, cannot form any sealing bead. Only one exceptional case is conceivable, to which reference will be made hereinbelow.

In principle, in a plan view of the sheet metal layer provided with the supporting bead according to the invention, the endless continuous line formed by the bead crest of the supporting bead could form, for example, a flat oval, a flat rectangle or the like, but, embodiments are preferred, in which, in a plan view of the sheet metal layer, the bead has, for the most part, a meandering shape. For, larger pressing forces can be received by such a supporting bead, without the risk of the supporting bead being flattened, than by a supporting bead whose bead crest follows a straight-lined or, at any rate, not meandering, course over a major part of its total length.

In order that the supporting bead according to the invention can receive as large pressing forces as possible without any appreciable risk of deformation, it is recommended that the supporting bead (in a plan view of the sheet metal layer) be designed such that the meander formed by it has a relatively large "packing density", and, it is, therefore, proposed that the supporting bead be designed such that, in a plan view of the sheet metal layer, the bead has at least substantially straight-lined meander legs joined to one another by bead arcs. This is in contrast to the supporting bead with a wave-like course shown, for example, in FIG. 5 of U.S. Pat. No. 5,427,389-A. With a view to achieving as high a degree of firmness of the supporting element according to the invention as possible, it is advantageous if, in a plan view of the sheet metal layer, at least several meander legs extend approximately parallel to one another, and it is recommended that, in a plan view of the sheet metal layer, at least in the case of several of the meander legs, the spacing between neighboring meander legs (58$b$) be, at the most, as large as (see FIG. 8) and, preferably, at the most approximately half as large as the bead width of the meander legs (see FIG. 7). In this case, the bead arcs joining the meander legs to one another have a relatively small radius, which, in conjunction with the small width of the bead, results, in a stamping tool with which the meander bead is stamped into the sheet metal layer, in the rib, corresponding to the meander bead to be stamped, of the one half of the stamping tool being very narrow and, in series production, tending to break away at those rib portions associated with the bead arcs to be stamped. Therefore, in a preferred embodiment of the invention, in a plan view of the sheet metal layer, the bead width in the area of the bead arcs is somewhat larger than in the area of the meander legs, so as to avoid an overloading of the said tool rib at its meander arcs.

In a supporting element according to the invention, formed substantially by a meander bead, free bead ends are easiest avoided by meander legs lying at two supporting element ends remote from one another being joined to one another by an elongate bead section. The ends of the two meander legs to be joined to one another could lie on the same side of the supporting element or on two different sides of the supporting element—in one case the elongate bead section is shorter than in the other case and runs only along the one side of the supporting element, in the other case, the elongate bead section runs along two sides of the supporting element that are adjacent to one another.

Precisely when, as will generally be the case, a supporting element according to the invention lies in the proximity of a screw through-opening of the flat gasket, it could be conceivable to allow the aforementioned bead section joining two meander legs to one another to partially enclose the adjacent screw through-opening, so that the screw through-opening (screw hole) lies between the "meander bead package" and the said bead section joining two meander legs (52$b$) to one another (see FIG. 9). Even then, however, a supporting element according to the invention, differs basically from such known metallic cylinder head gaskets in which each screw through-opening is surrounded by a bead closed within itself, which, in a plan view of the pertinent sheet metal layer, is circular, oval or of similar shape, because in the case of these known bead structures an essential feature of preferred embodiments of the supporting element according to the invention is not present, namely that the total length of that portion of the supporting bead which lies on one side of a through-opening of the flat gasket is a multiple of (at least, for example, three, four or five times) the remaining length of the supporting bead.

As will be apparent from the remarks made at the outset on the various positions of supporting elements, a preferred flat gasket according to the invention, designed as a cylinder head gasket for a multi-cylinder engine, is characterized in that in the at least one sheet metal layer provided with several supporting elements, the supporting elements are arranged in at least one of the following areas of the gasket plate having an elongate shape with two narrow sides and two longitudinal sides: in the end areas of the gasket plate in the proximity of the narrow sides of the gasket plate and in the edge areas of the gasket plate in the proximity of the longitudinal sides of the gasket plate.

If the flat gasket according to the invention is multi-layered, i.e., has at least two sheet metal layers arranged one on the other, it is advantageous for the bead formed in at least one sheet metal layer to project in the direction towards the other sheet metal layer, i.e., not to project at one of the two free main surfaces of the flat gasket—this could cause indentations or frictional wear phenomena on one of the component sealing surfaces between which the flat gasket is clamped.

Further advantages, features and details of the invention will be apparent from the following description and the appended drawings of a preferred embodiment of a flat gasket according to the invention, a preferred embodiment of a supporting bead according to the invention and a preferred embodiment of a stamping tool for producing this supporting bead.

DETAILED DESCRIPTION OF THE INVENTION

The sheet metal layer, shown partly in FIG. 1, of a cylinder head gasket according to the invention will only be described hereinbelow insofar as this is required for an understanding of the invention.

Figure 1:
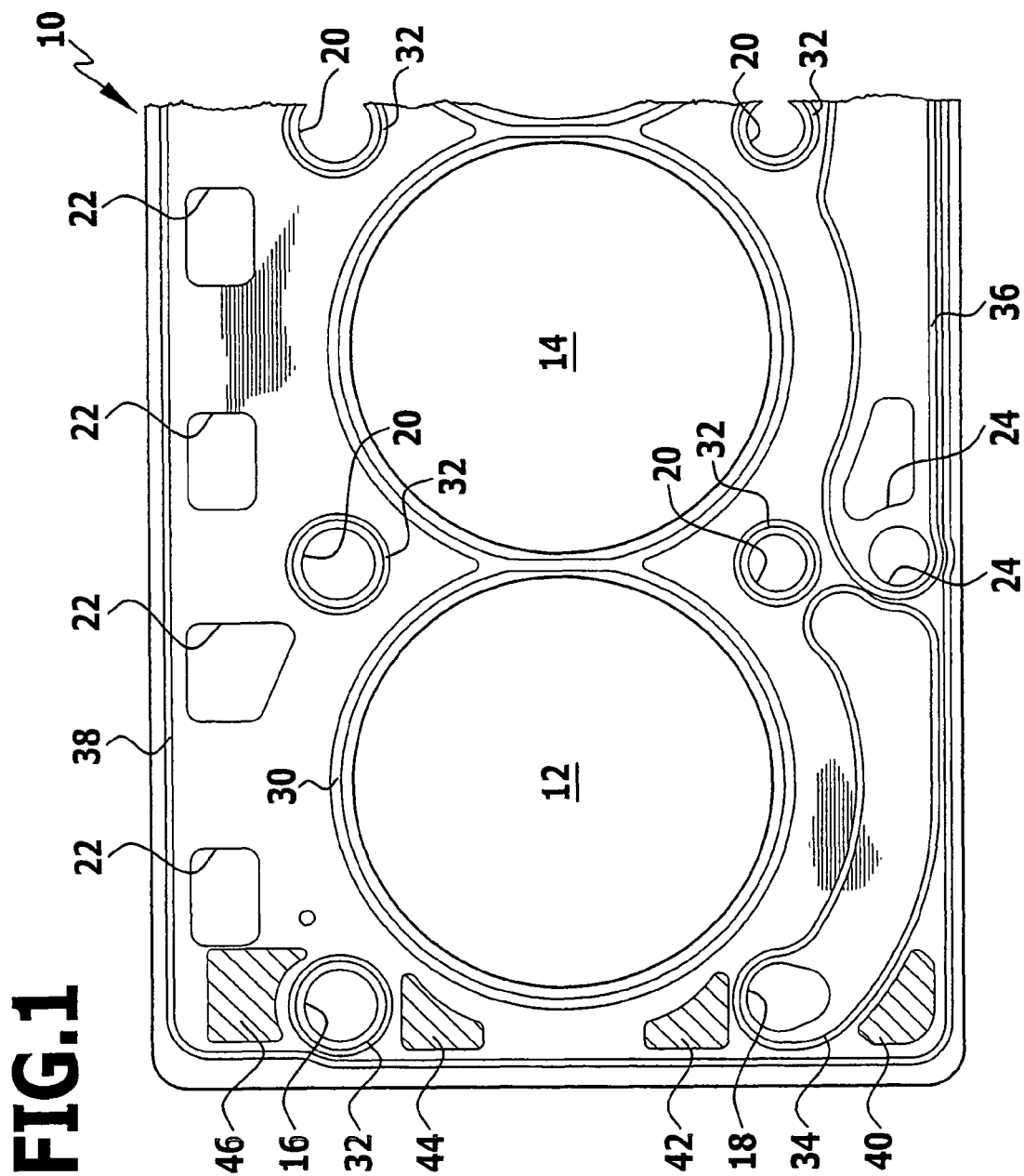
FIG. 1 shows a plan view of part of a sheet metal layer of a flat gasket according to the invention, designed as a cylinder head gasket, with supporting elements according to the invention shown schematically therein.

The sheet metal layer 10 made from sheet spring steel comprises, in the part shown in FIG. 1, combustion chamber through-openings 12 and 14, screw holes 16 and 18 adjacent to the narrow side of the sheet metal layer, and further screw holes 20, water holes 22 for passage of cooling water and oil holes 24 for passage of engine oil. The screw holes 16, 18 and 20 serve for passage of cylinder head screws therethrough, and the non-circular screw hole 18 serves, in addition, for passage of engine oil. For sealing around the combustion chamber through-openings 12, 14, the sheet metal layer 10 is provided in the usual manner with combustion chamber sealing beads 30 with elastic properties in the direction of their height, which are stamped into the sheet metal layer. These are so-called full beads whose cross section thus corresponds approximately to the arc of a circle or a U. This also applies to the following beads stamped into the sheet metal layer 10: circular beads 32 enclosing the screw holes 16 and 20, oil sealing beads 34 and 36 and a so-called water bead 38, which extends as a continuous line closed within itself around the sheet metal layer 10 in the proximity of the periphery of the sheet metal layer 10 and thus serves together with the other beads, when the cylinder head gasket is installed, to seal those spaces which cooling water can enter owing to the water holes 22 when the cylinder head gasket is installed.

In the illustrated cylinder head gasket according to the invention, the sheet metal layer 10 is provided in the vicinity of the screw holes 16 and 18 with supporting elements 40, 42, 44 and 46 according to the invention, which serve, when the cylinder head gasket is installed, to support the longitudinal end areas of the cylinder head adjacent to the narrow sides of the cylinder head, more specifically, by the supporting elements forming thickened areas of the sheet metal layer 10, which are at least substantially compression-proof, i.e., are not deformable in their height (under the pressing forces acting upon the cylinder head gasket when the cylinder head gasket is being installed and while the engine is in operation).

In preferred embodiments of the invention, as shown in FIG. 1, the supporting elements 40, 42, 44, 46 are arranged not only in the proximity of the narrow side of the sheet metal layer 10 but also in the proximity of the screw holes 16, 18 adjacent to this narrow side so as to receive part of the pressing forces generated by the two cylinder head screws adjacent to the narrow side of the cylinder head gasket.

However, a cylinder head gasket according to the invention may also be provided with one or more supporting elements according to the invention at other places. If, for example, the engine block belonging to the illustrated cylinder head gasket has a lesser stiffness at its one longitudinal side owing to cooling water cavities, namely in the area of that longitudinal side to which the water holes 22 are adjacent, when the cylinder head gasket is installed, the sheet metal layer 10 could be provided with one supporting element or with several supporting elements between two or between several of these water holes.

Figure 2:
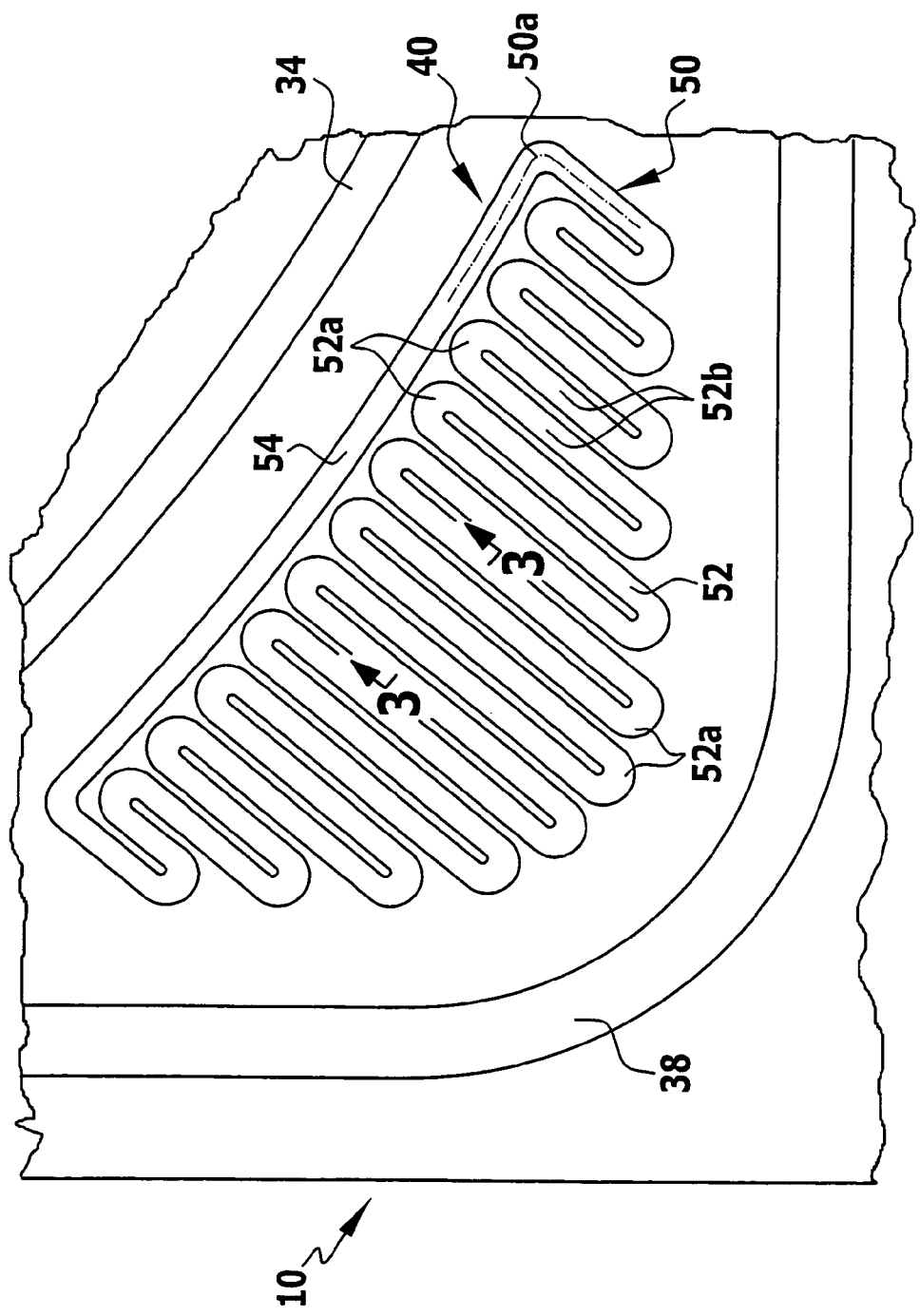
FIG. 2 shows a plan view of the left lower corner of the sheet metal layer shown in FIG. 1 and the supporting element according to the invention arranged there.
Figure 3:
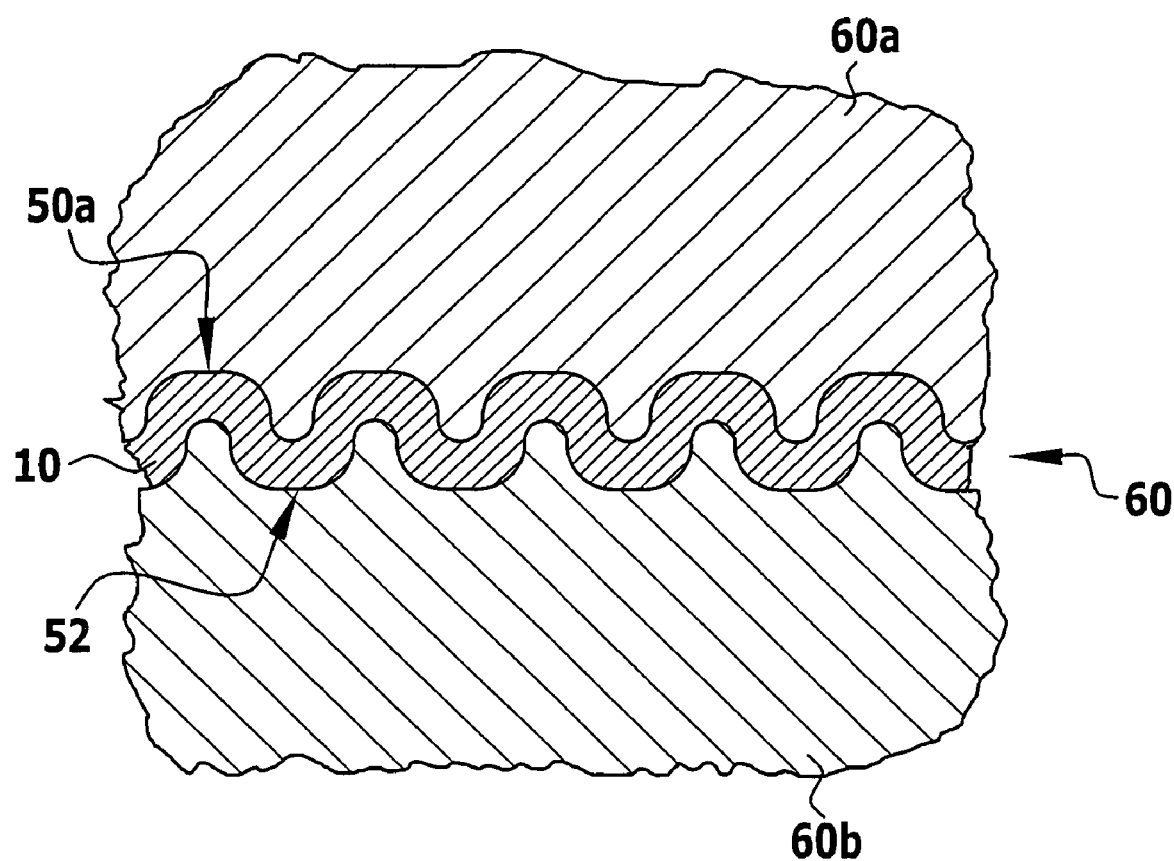
FIG. 3 shows a section taken along line 3-3 in FIG. 2 and part of the stamping tool used for stamping the supporting element.

FIG. 2 shows the supporting element 40, serving as an example representative of the invention, which is formed by a bead 50 stamped in the sheet metal layer 10. The supporting element 40 consists substantially of a meander-shaped structure, designated hereinbelow as meander bead 52, which is formed by the bead 50. As shown in FIG. 3, the bead 50 is a so-called full bead whose crest is designated by 50a. The ends of the meander bead 52 that are located at the top left and the bottom right of FIG. 2 are joined by an elongate bead section 54 in such a way that the bead crest 50a forms an endless continuous line closed within itself, so that the bead 50 has no free ends. As an alternative to the embodiment shown in FIG. 2, the ends of the meander bead 52 could be joined to one another by a bead section extending, in accordance with FIG. 2, to the left of and below the meander bead 52. The meander bead 52 advantageously consists of straight-lined meander legs 52b which are joined to one another by bead arcs 52a. The meander legs 52b extend parallel to one another and are so densely "packed", i.e., have such a small spacing from one another, as is just still producible by a stamping operation. Owing to this high "packing density", a particularly stiff supporting element is obtained, which is at least substantially stable, i.e., is not deformable in its height by the pressing forces that occur when the cylinder head gasket is being installed and while the engine is in operation.

Virtually any outer contour (in a plan view of the sheet metal layer 10) of the supporting element 40 may be brought about by different lengths of the meander legs 52b.

FIG. 3 shows parts of the two halves 60a and 60b of a pressing tool 60 for stamping the bead 50, and a cross section through the meander bead 52 and the bead crest 50a.

Figure 4:
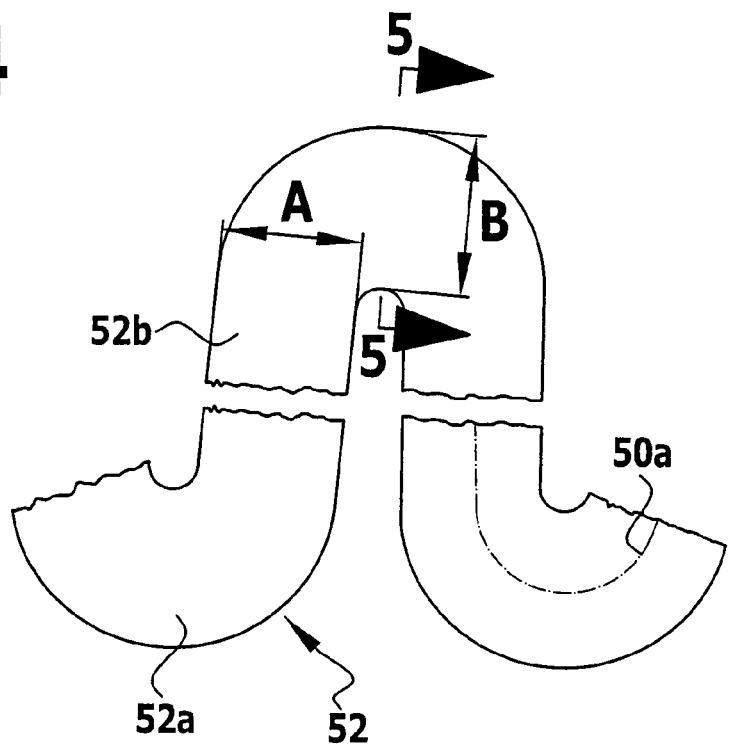
FIG. 4 shows a detail from FIG. 2 with an enlarged plan view of an area of the supporting element.

FIG. 4 shows a plan view of part of the meander bead 52 on an enlarged scale, wherein the meander leg 52b was interrupted in order to shorten the vertical extent of this figure of the drawings. In an embodiment which is representative of the invention, the thickness of the sheet metal layer 10 ranges from approximately 0.2 to 0.3 mm. The width, designated A in FIG. 4, of the meander leg 52b then lies in the range of between approximately 0.5 and approximately 0.9 mm. In the embodiment shown in FIGS. 4 and 5, the thickness of the sheet metal layer 10 is intended to be 0.2 mm and the width A of the meander legs 52b 0.56 mm.

Figure 5:
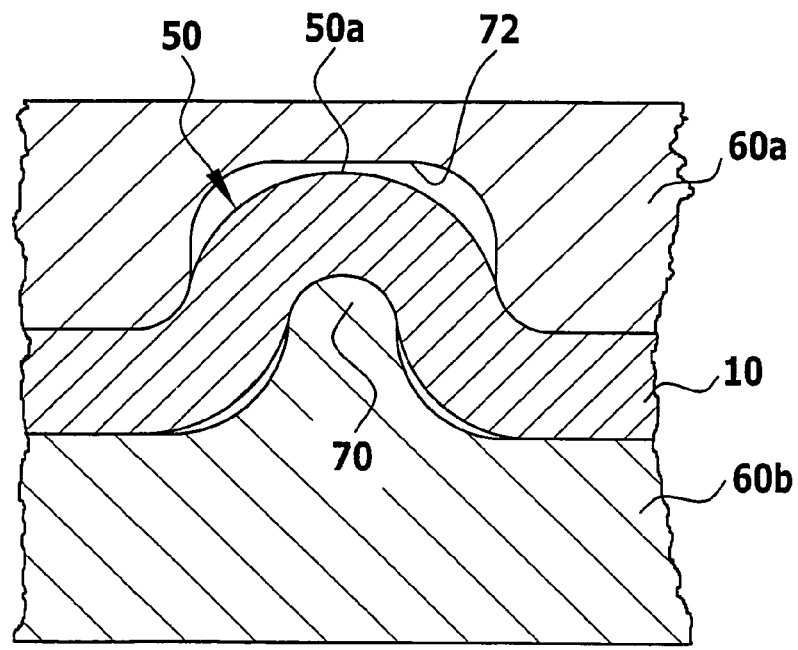
FIG. 5 shows a section taken along line 5-5 in FIG. 4 and through part of the stamping tool.

From FIG. 5, which shows a section on line 5-5 in FIG. 4 through the sheet metal layer 10 and the pressing tool 60, in conjunction with FIG. 4, the following will be apparent: the, in accordance with FIG. 5, lower pressing tool half 60b has a rib 70, the upper pressing tool half 60a has a groove 72, and, in a plan view, not shown, of the pressing tool, the rib 70 and the groove 72 each have a shape corresponding to the shape, shown in FIG. 2, of the bead 50, i.e., over the greatest part of their lengths the rib 70 and the groove 72 have a meander-shaped configuration, however, in that area which serves to stamp the elongate bead section 54 an elongate, for example, approximately straight-lined configuration.

Owing to the sharp curvature of the arcs 52a of the beads, the rib 70 is subjected to high stress in those areas of the pressing tool 60 which serve to stamp the arcs 52a of the beads. In order to prevent the rib 70 from wearing rapidly or even breaking away in these heavily stressed areas, the bead width B (see FIG. 4) at the arcs 52a of the beads is, in accordance with the invention, somewhat larger than the bead width A in the area of the meander legs 52b-if dimension A is, for example, 0.56 mm, then dimension B is, for example, 0.66 mm.

Figure 6:
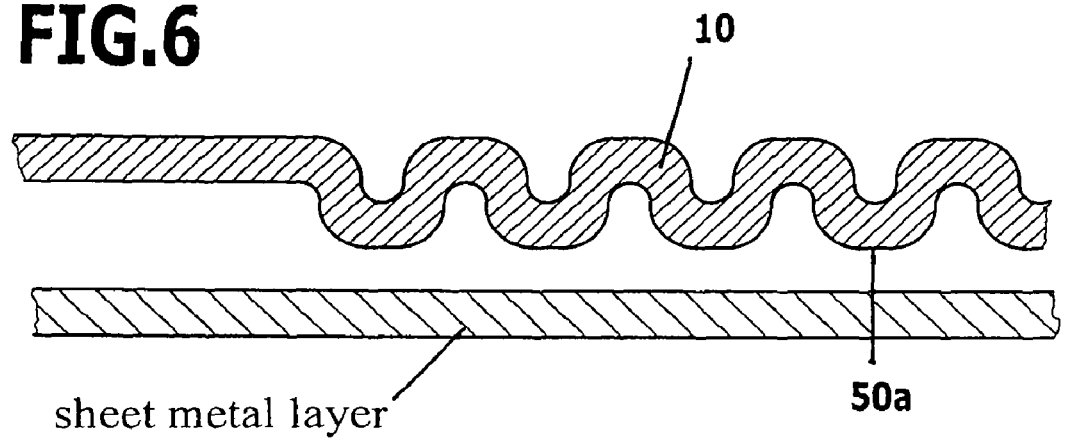
FIG. 6 is a section view showing an embodiment according to the invention having two sheet metal layers.
Figure 7:
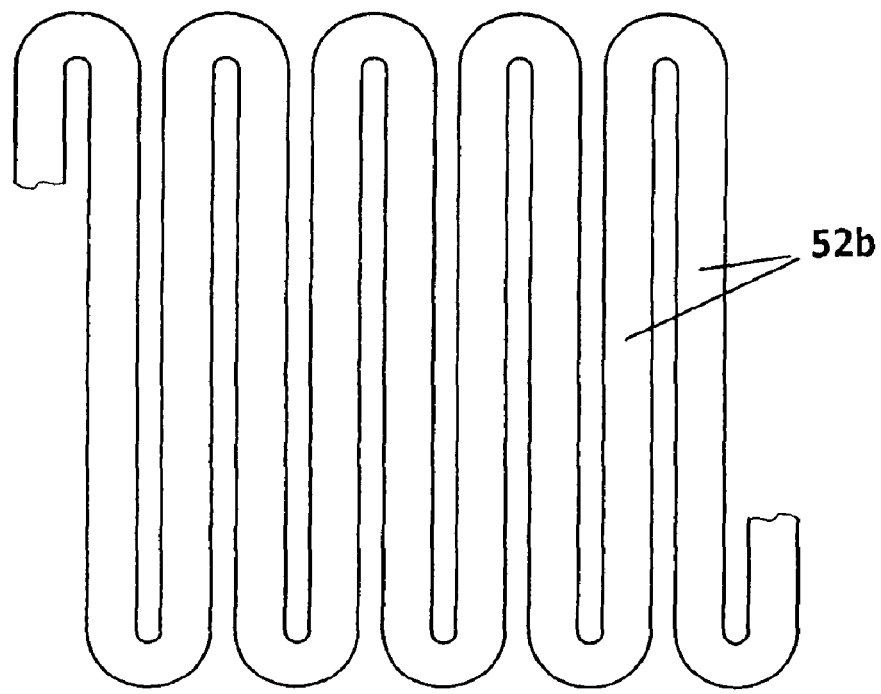
FIGS. 7, 8 and 9 are plan views showing other particular embodiments according to the invention.
Figure 8:
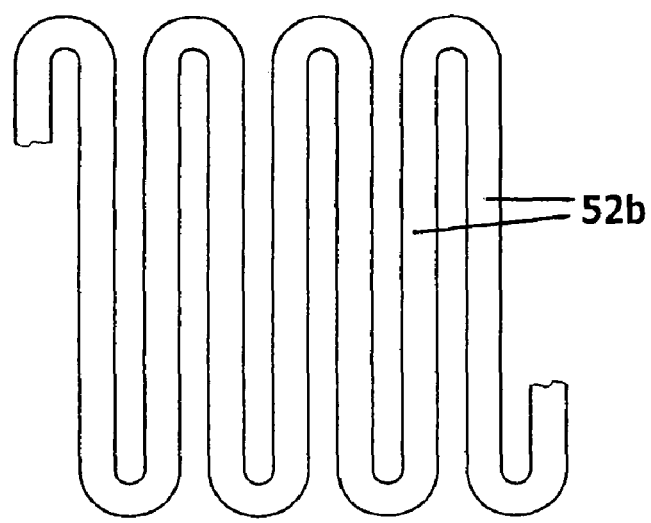
Figure 9:
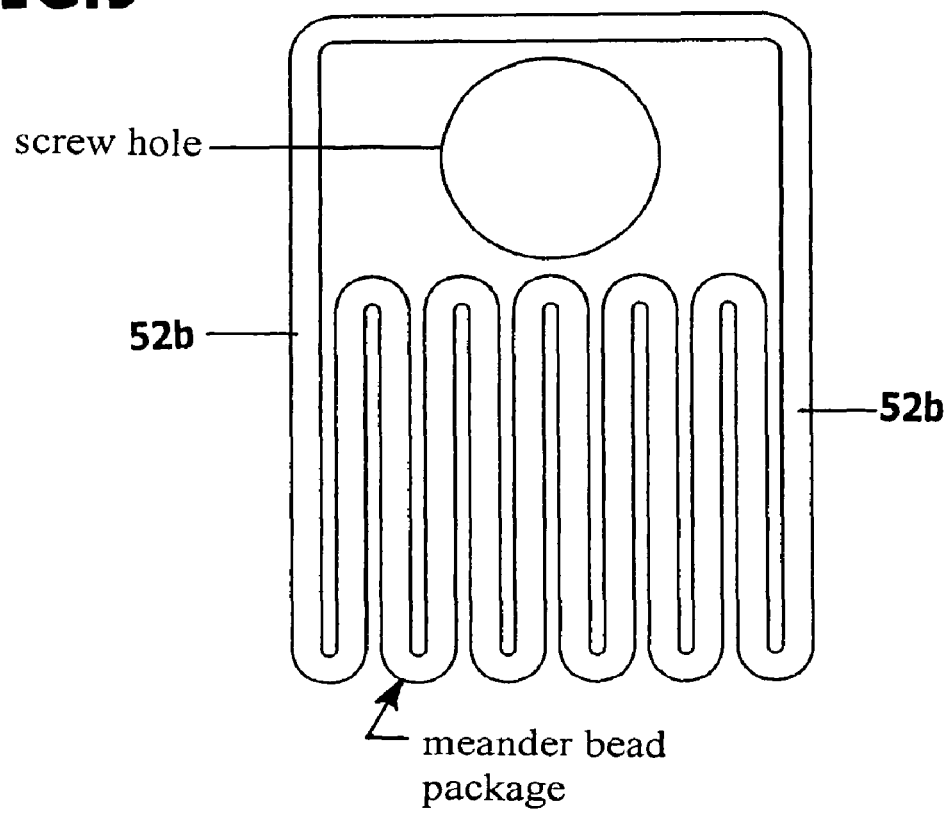

If a flat gasket according to the invention, in particular, a cylinder head gasket, is multi-layered, i.e., if it has at least two sheet metal layers arranged one on the other (see FIG. 6), it is advantageous for a bead stamped into one of these sheet metal layers and forming a supporting element according to the invention to project in the direction towards the other sheet metal layer in order that the bead crest 50a will rest against a sheet metal layer of the flat gasket and when the gasket is installed —not against one of the sealing surfaces of those components between which the flat gasket is clamped.

In a modification of the embodiment shown in the drawings and described hereinabove, the supporting elements according to the invention and the beads serving as sealing elements may be provided on different sheet metal layers in a multi-layered flat gasket. Accordingly, a sheet metal layer with sealing beads and another sheet metal layer with supporting elements could be provided.

According to the definition of the basic concept underlying the present invention, a supporting element according to the invention comprises at least one bead stamped into a sheet metal layer. In a modification of the embodiment shown in the drawings and described hereinabove, a supporting element could also have several beads, for example, two beads, which both have a meander-like configuration over the greatest part of their length with the meander loops of one bead extending into the meander loops of the other bead, so that the two beads run approximately parallel to each other, in particular, everywhere. Furthermore, a supporting element according to the invention could be formed by a bead which with a first bead section forms a first meander-shaped structure and with a second bead section a second meander-shaped structure, with the meander legs of one meander-like structure extending, for example, approximately perpendicularly to the meander legs of the other meander-like structure, and the ends of one meander being joined to the ends of the other meander by further bead sections in such a way that the bead crest of the entire bead forms a continuous line closed within itself.

It is pointed out again that—as will be apparent from FIG. 2—a feature of preferred embodiments of the invention is to be seen in that a supporting element according to the invention comprises:

(a) a plurality of at least approximately straight-lined meander legs joined to one another by approximately semicircular bead arcs, the meander legs extending at least approximately parallel to one another and being spaced from one another at a distance which is smaller than the bead width, so that the meander legs and the meander arcs form a bead package having as high a packing density as possible, and (b) an elongate bead section which joins ends of two meander legs lying at the edge of the bead package to one another.

The invention claimed is:

1. Flat gasket with a gasket plate comprising at least one sheet metal layer and having a plurality of apertures, said plurality of apertures comprising at least one fluid through-opening to be sealed and a plurality of screw through-openings for the passage of screws therethrough for clamping the flat gasket between sealing surfaces of components, said sheet metal layer having at least one supporting element for receiving pressing forces acting on the flat gasket when the flat gasket is installed, and said supporting element comprising at least one non-sealing bead stamped into the sheet metal layer and having a bead crest forming a continuous line, said bead forming with its bead crest, in a plan view of the sheet metal layer, an endless continuous line closed within itself, so that the bead does not have any free bead ends, wherein at least one of said at least one supporting element is located in an area of the gasket plate that is free of any of said apertures so that the at least one bead of said supporting element does not enclose anyone or a group of said apertures, and wherein, in a plan view of the sheet metal layer, said bead has a meandering shape over a major part of the total length of said bead and comprises at least substantially straight bead sections joined to one another by arc sections of said bead.

2. Flat gasket in accordance with claim 1, wherein the bead is a full bead.

3. Flat gasket in accordance with claim 1, wherein, in a plan view of the sheet metal layer, the bead width of the bead arc sections is somewhat larger than the width of said straight bead sections.

4. Flat gasket in accordance with claim 1, wherein, in a plan view of the sheet metal layer, at least several of said straight bead sections extend approximately parallel to one another.

5. Flat gasket in accordance with claim 4, wherein, in a plan view of the sheet metal layer, at least for several of the straight bead sections, the spacing between neighboring straight bead sections is at most as large as the bead width of the straight bead sections.

6. Flat gasket in accordance with claim 5, wherein, in a plan view of the sheet metal layer, at least for several of the straight bead sections, the spacing between neighboring straight bead sections corresponds approximately to half of the bead width of the straight bead sections.

7. Flat gasket in accordance with claim 1, wherein, in a supporting element, two straight bead sections located at two ends of said supporting element remote from one another are joined to one another by an elongate connecting bead section.

8. Flat gasket in accordance with claim 1, wherein at least one supporting element is arranged in the proximity of one of said screw through-openings.

9. Flat gasket in accordance with claim 1, which is designed as a cylinder head gasket for a multi-cylinder engine, wherein said gasket plate comprises a plurality of combustion chamber through-openings and has an elongate shape with two narrow sides and two longitudinal sides, and wherein the at least one sheet metal layer is provided with several ones of said at least one supporting element, which several ones are arranged in at least one of the following areas of the gasket plate: in end areas of the gasket plate in the proximity of the narrow sides of the gasket plate, and in edge areas of the gasket plate in the proximity of the longitudinal sides of the gasket plate.

10. Flat gasket in accordance with claim 1, wherein said gasket plate comprises at least two sheet metal layers arranged one on the other, and wherein a bead formed in a sheet metal layer of said at least two sheet metal layers projects in the direction towards another one of said at least two sheet metal layers.

11. Flat gasket with a gasket plate comprising at least one sheet metal layer and having a plurality of apertures, said plurality of apertures comprising at least one fluid through-opening to be sealed and a plurality of screw through-openings for the passage of screws therethrough for clamping the flat gasket between sealing surfaces of components, said sheet metal layer having at least one supporting element for receiving pressing forces acting on the flat gasket when the flat gasket is installed, and said supporting element comprising at least one bead stamped into the sheet metal layer and having a bead crest forming a continuous line, said bead forming with its bead crest, in a plan view of the sheet metal layer, an endless continuous line closed within itself, so that the bead does not have any free bead ends, wherein, in a plan view of the sheet metal layer, said at least one bead of at least one of said at least one supporting element has a shape forming a meandering bead section comprising elongated bead sections joined to one another by bead arc sections, at least some of said elongated bead sections extending at least approximately parallel to one another.

12. Flat gasket according to claim 11, wherein the bead is a full bead.

13. Flat gasket according to claim 11, wherein, in a plan view of the sheet metal layer, the bead width of the bead arc sections is somewhat larger than the width of said elongated bead sections.

14. Flat gasket in accordance with claim 11, wherein, in a plan view of the sheet metal layer, at least for several of the elongated bead sections, the spacing between neighboring elongated bead sections is at most as large as the bead width of the elongated bead sections.

15. Flat gasket in accordance with claim 14, wherein, in a plan view of the sheet metal layer, at least for several of the elongated bead sections, the spacing between neighboring elongated bead sections corresponds approximately to half of the bead width of the elongated bead sections.

16. Flat gasket in accordance with claim 11, wherein, in a supporting element of said at least one supporting element, two elongated bead sections located at two ends of said supporting element remote from one another are joined to one another by an elongate connecting bead section.

17. Flat gasket in accordance with claim 11, wherein at least one supporting element is arranged in the proximity of one of said screw through-openings.

18. Flat gasket in accordance with claim 11, which is designed as a cylinder head gasket for a multi-cylinder engine, wherein said gasket plate comprises a plurality of combustion chamber through-openings and has an elongate shape with two narrow sides and two longitudinal sides, and wherein the at least one sheet metal layer is provided with several ones of said at least one supporting element, which several ones are arranged in at least one of the following areas of the gasket plate: in end areas of the gasket plate in the proximity of the narrow sides of the gasket plate and in edge areas of the gasket plate in the proximity of the longitudinal sides of the gasket plate.

19. Flat gasket in accordance with claim 11, wherein said gasket plate comprises at least two sheet metal layers arranged one on the other, and wherein said bead of said supporting element is stamped in a sheet metal layer of said at least two sheet metal layers and projects in the direction towards another one of said at least two sheet metal layers.

20. Flat gasket with a gasket plate comprising at least one sheet metal layer and having a plurality of apertures, said plurality of apertures comprising at least one fluid through-opening to be sealed and a plurality of screw through-openings for the passage of screws therethrough for clamping the flat gasket between sealing surfaces of components, said sheet metal layer having at least one supporting element for receiving pressing forces acting on the flat gasket when the flat gasket is installed, and said supporting element comprising at least one bead stamped into the sheet metal layer and having a bead crest forming a continuous line, said bead forming with its bead crest, in a plan view of the sheet metal layer, an endless continuous line closed within itself, so that the bead does not have any free bead ends, wherein at least one of said at least one supporting element is located in an area of the gasket plate comprising one of said screw through-openings, wherein, in a plan view of the sheet metal layer, said at least one bead of said supporting element has a shape forming a meandering bead section having a meander end at each end of said meandering bead section, said meander ends being joined to one another by an elongate connecting bead section, and wherein said screw through-opening is located between said meandering bead section and said elongate connecting bead section.

21. Flat gasket in accordance with claim 20, wherein the bead is a full bead.

22. Flat gasket in accordance with claim 20, wherein, in a plan view of the sheet metal layer, the meandering bead section comprises at least substantially straight bead sections joined to one another by arc sections of the bead.

23. Flat gasket in accordance with claim 22, wherein, in a plan view of the sheet metal layer, the bead width of the bead arc sections is somewhat larger than the width of said straight bead sections.

24. Flat gasket in accordance with claim 22, wherein, in a plan view of the sheet metal layer, at least several of said straight bead sections extend approximately parallel to one another.

25. Flat gasket in accordance with claim 24, wherein, in a plan view of the sheet metal layer, at least for several of the straight bead sections, the spacing between neighboring straight bead sections is at most as large as the bead width of the straight bead sections.

26. Flat gasket in accordance with claim 25, wherein, in a plan view of the sheet metal layer, at least for several of the straight bead sections, the spacing between neighboring straight bead sections corresponds approximately to half of the bead width of the straight bead sections.

27. Flat gasket in accordance with claim 20, which is designed as a cylinder head gasket for a multi-cylinder engine, wherein said gasket plate comprises a plurality of combustion chamber through-openings and has an elongate shape with two narrow sides and two longitudinal sides, and wherein the at least one sheet metal layer is provided with several ones of said at least one supporting element, which several ones are arranged in at least one of the following areas of the gasket plate: in end areas of the gasket plate in the proximity of the narrow sides of the gasket plate and in edge areas of the gasket plate in the proximity of the longitudinal sides of the gasket plate.

28. Flat gasket in accordance with claim 20, wherein said gasket plate comprises at least two sheet metal layers arranged one on the other, and wherein a bead formed in a sheet metal layer of said at least two sheet metal layers projects in the direction towards another one of said at least two sheet metal layers.

\* \* \* \* \*